Oct. 7, 1924.  
G. W. ENGLISH  
LATHE, DRILL, AND LIKE MACHINE  
Filed Nov. 2, 1921
1,510,771
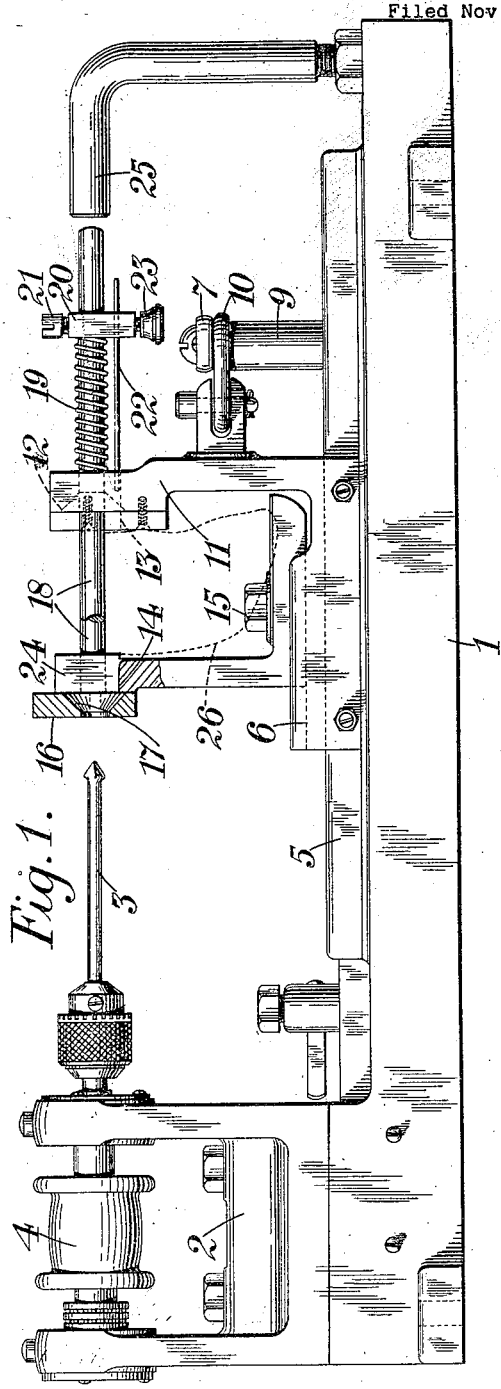
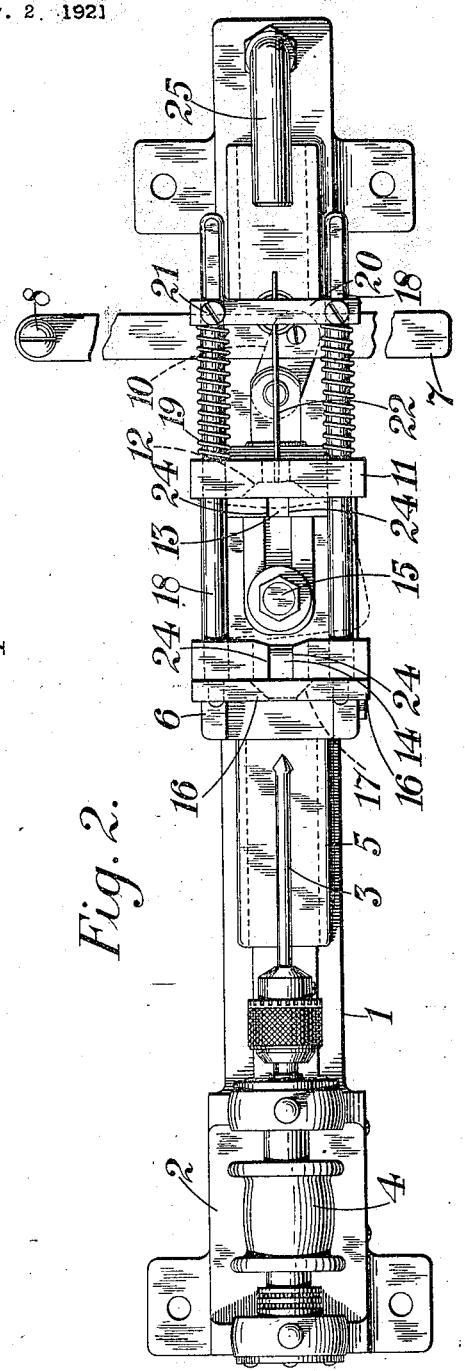
Inventor  
George W. English,  
By Watson, Coit, Morse & Grindle,  
Attorneys.

Patented Oct. 7, 1924.

1,510,771

UNITED STATES PATENT OFFICE.

GEORGE WILLIAM ENGLISH, OF SHEFFIELD, ENGLAND, ASSIGNOR TO ROPER & WREAKS LIMITED, OF SHEFFIELD, ENGLAND, A BODY CORPORATE OF ENGLAND.

LATHE, DRILL, AND LIKE MACHINE.

Application filed November 2, 1921. Serial No. 512,349.

*To all whom it may concern:*

Be it known that I, GEORGE WILLIAM ENGLISH, a subject of the King of England, residing at 20 Club Street, Sheffield, England, have invented certain new and useful Improvements in or Relating to Lathes, Drills, and like Machines, of which the following is a specification, reference being had therein to the accompanying drawing.

This invention relates to lathes, drills and like machines, its object being to provide improved means for centring and holding work to be bored or centred longitudinally. The invention is particularly applicable for boring handles to receive the tangs of table cutlery and tools whether the handles are of square, rectangular, round or any other symmetrical cross section. The invention may also be used for centring work which is required to be held between centres on a lathe.

According to the present invention two jaws are provided movable towards and away from each other and each having a co-axial conical recess with its larger diameter facing that of the other. A rest may be provided at about the level of the lower edge of each conical recess, whilst means are provided for preventing rotation of work held in the recesses in relation to the jaws, such as for example, by providing an arm extending from the rests on each side of the axis of the recesses. Preferably the jaws are carried on a movable work-holder and one of them is relatively fixed thereon with its rest, whilst the rest for the other jaw is adjustable on the work-holder, and this other jaw is movable on the work-holder being conveniently mounted in guides or on guide rods carried by the adjustable rest. These guide rods may extend one on each side of the axis of the conical recesses to the fixed jaw and a spring tending to close the jaws be furnished on the guide rods. An ejector may be provided operated with the movable jaw to pass above the rest of the fixed jaw and a stationary stop may be provided on the machine adapted to open the jaws and to operate the ejector by contact with an abutment on the movable jaw or its guide rods on the movement of the work-holder towards the stop.

The accompanying drawings, of which Figure 1 is an elevation partly in section and Figure 2 is a plan, represent the present invention applied to a lathe suitable for boring cutlery and tool handles longitudinally.

Like reference numerals indicate like parts throughout the drawings.

The bed 1 of the lathe is provided with a head-stock 2 carrying a tool 3 suitable for boring longitudinally the handles, the tool 3 being rotated from any convenient source of power by means of a belt passing around a pulley 4.

The bed 1 is also provided with guides 5 upon which a work-holder 6 is capable of sliding towards and away from the head-stock 2. This sliding movement of the work-holder 6 may be effected in any convenient manner, as for example, by means of a lever 7 fulcrumed at 8 to a suitable bracket 9 carried by the bed 1, the lever 7 being linked as shown at 10 to the work-holder 6.

The work-holder 6 carries a relatively fixed jaw 11 which is provided with a conical recess 12 co-axial with the tool 3. The larger diameter or wider opening of this conical recess 12 is arranged to face the tool 3 and at or about its lower edge a rest 13 is provided, conveniently carried by the jaw 11. At or about the same level a second rest 14 is provided on the work-holder 6. The distance between the rest 14 and the fixed jaw 11, 12, is preferably capable of being adjusted, the rest 14 sliding in relation to the work-holder 6 and being clamped thereto in the desired position as shown at 15.

The work-holder 6 also carries a movable jaw 16 which is likewise provided with a conical recess 17 co-axial with the tool 3 and with the recess 12. The movable jaw 16 is disposed so that the larger diameter or wider opening of its conical recess 17 faces the conical recess 12, the jaw 16 being disposed on the tool side of the rest 14.

In the construction illustrated the movable jaw 16 is carried by two guide rods 18 which slide in suitable holes or guides in the rest 14 and fixed jaw 11 on each side of the axis of the tool 3.

The movable jaw 16 is normally moving towards the fixed jaw 11 up to the rest 14 by means of springs 19 acting between the fixed jaw 11 and an abutment 20 which is clamped to the guide rods 18 as shown at 21.

An extractor rod 22 is carried by the abutment 20 and its position is preferably adjustable by means of a set screw 23. The extractor rod 22 passes through a suitable hole in the fixed jaw 11, the parts being so arranged that as the movable jaw 16 is moved against the action of the springs 19 the extractor rod 22 moves with it and passes across the top of the rest 13.

In order to prevent rotation of work in relation to the conical recesses 12, 17 when held therein, the rests 13 and 14 are provided with arms 24 extending on each side of the axis of the tool 3. In the construction illustrated the rests 13, 14 and their arms 24 are formed by slotting the material of which they are made.

A stationary stop 25 is provided on the bed 1 in the path of the abutment 20 and it will be appreciated that by moving the work-holder 6 away from the tool 3 the movable jaw 16 will be moved in relation to the jaw 11 against the action of the springs 19 by contact of the abutment 20 with the stationary stop 25. When the jaws have thus been opened the handle or other work to be centred and bored is dropped on to the rests 13 and 14. The work-holder 6 is then moved towards the tool 3, whereby the springs 19 will re-act to close the jaws, whereupon the work will be accurately centred between the conical recesses 17 and 12.

Means are provided for enabling the tool 3 to enter the conical recess 17 (the recess conveniently extending through the jaw) and further movement of the work-holder 6 towards the tool will bring the latter into operation to bore the work longitudinally. On moving the work-holder back to re-open the jaws 16, 11 the work will fall onto the rests 13, 14 and the extractor rod 22 will then move across the top of the rest 13 pushing the work with it until the work falls off this rest when it will also leave the rest 14 and may be guided clear of the work-holder by means of a chute indicated in dotted lines at 26.

The machine is preferably adjusted so that when the work is held in the conical recesses 12 and 17 there is a slight clearance between the jaw 16 and the rest 14.

The arms 24 are only operative to hold work which is other than circular in cross section against rotation. So far as cylindrical work is concerned the present invention is chiefly useful for centring it for which purpose it may be held against rotation by hand.

The machine may be easily adjusted for work of different lengths by varying the distance between the rest 14 and the relatively fixed jaw 11 and by making corresponding adjustments in the force exerted by the springs 19 by varying the position of the abutment 20 on the guide rods 18.

As a modification the springs 19 may be re-placed by a wedge or cam moved between the abutment 20 and the relatively fixed jaw 11.

What I claim is:

1. In a device of the class described, in combination, a rotatable tool; a movable work holder comprising a support, a jaw fixed with respect to the support having a conical recess coaxial with and facing the tool, a rest at the lower edge of said recess, a second rest on the support between the fixed jaw and the tool, means for adjusting the distance between said second rest and the fixed jaw, a second jaw movable with respect to the support disposed between the second rest and the tool and having a conical recess coaxial with the tool and facing the fixed jaw, means for enabling the tool to enter the recess in the second jaw and means for moving the second jaw with respect to the fixed jaw; and means for moving the work holder toward and away from the tool.

2. In a device of the class described, in combination, a rotatable tool; a movable work holder comprising a support, a jaw fixed thereon having a conical recess coaxial with and facing the tool, a rest at the lower edge of the recess, a second rest on the support between the fixed jaw and the tool, a guide in said second rest, a rod slidable in the guide, a movable jaw carried by the rod between the second rest and the tool, said movable jaw having a conical recess coaxial with the tool and facing the fixed jaw, means for enabling the tool to enter the recess, means to move the jaws toward each other, and an ejector rigidly secured to the rod and adapted to move over the first rest when the jaws are separated; and a stationary stop adapted to separate the jaws when the work holder is moved away from the tool.

3. In a device of the class described, in combination, a rotatable tool; a work holder comprising a support, a jaw fixed thereon having a conical recess coaxial with and facing the tool, a rest at the lower edge of the conical recess, a movable jaw on the support between the fixed jaw and the tool having a conical recess coaxial with the tool and facing the fixed jaw, means for enabling the tool to enter the recess of the movable jaw, a spring tending to move the movable jaw toward the fixed jaw, a second rest on the support at the level of the lower edge of the rests adapted to limit the movement of the movable jaw toward the fixed jaw, means for adjusting the distance between the second rest and the fixed jaw, and means on one or both of said rests for preventing rotation of the work; and means for moving the work holder toward and away from the tool.

4. In a device of the class described, in combination, a rotatable tool; a movable work holder comprising a relatively fixed and a relatively movable jaw each in alignment with the tool and means tending to move said jaws toward each other; means for moving the holder toward and away from the tool; and means for automatically separating the jaws and ejecting the work therefrom when the holder is moved away from the tool.

5. In lathes, drills and like machines the combination of a rotating tool, a work-holder, means for moving the work-holder relatively to the tool, towards and away therefrom, a relatively fixed jaw on the work-holder having a conical recess co-axial with the tool with its wider opening facing the tool, a rest at the lower edge of the said conical recess, a movable jaw on the work-holder between the fixed jaw and the tool having a conical recess co-axial with the tool with its wider opening facing the fixed jaw, means for enabling the tool to enter the conical recess of the movable jaw, a spring tending to move the movable jaw towards the fixed jaw, a second rest on the work-holder at the level of the lower edge of the conical recesses limiting the movement of the movable jaw towards the fixed jaw, means for adjusting the distance between the second rest and the fixed jaw, an arm extending from a rest on each side of the axis of the said conical recesses, a stationary stop, and an abutment on the movable jaw contacting therewith on movement of the work-holder away from the tool.

6. In lathes, drills and like machines the combination of a rotating tool, a work-holder, means for moving the work-holder relatively to the tool, towards and away therefrom, a relatively fixed jaw on the work-holder having a conical recess co-axial with the tool with its wider opening facing the tool, a rest at the lower edge of the said conical recess, a movable jaw on the work-holder, between the fixed jaw and the tool having a conical recess co-axial with the tool with its wider opening facing the fixed jaw, means for enabling the tool to enter the conical recess of the movable jaw, a spring tending to move the movable jaw towards the fixed jaw, a second rest on the work-holder at the level of the lower edge of the conical recesses limiting the movement of the movable jaw towards the fixed jaw, means for adjusting the distance between the second rest and the fixed jaw, an arm extending from a rest on each side of the axis of the said conical recesses, a stationary stop, an abutment on the movable jaw contacting therewith on movement of the work-holder away from the tool, and an ejector carried by the movable jaw capable of moving above the rest of the fixed jaw as the movable jaw is moved against the action of its spring.

In witness whereof I have hereunto set my hand in the presence of two witnesses.

GEORGE WILLIAM ENGLISH.

Witnesses:
 ARTHUR H. GREENWOOD,
 HAWTHORN WRIGHT.